(12) United States Patent
Urabe et al.

(10) Patent No.: US 6,559,916 B1
(45) Date of Patent: *May 6, 2003

(54) REFLECTIVE GUEST-HOST LIQUID-CRYSTAL DISPLAY DEVICE

(75) Inventors: Tetsuo Urabe, Kanagawa (JP); Hideo Kataoka, Kanagawa (JP); Nobuyuki Shigeno, Kanagawa (JP)

(73) Assignee: Sony Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 856 days.

(21) Appl. No.: 08/684,299

(22) Filed: Jul. 18, 1996

(30) Foreign Application Priority Data

Jul. 19, 1995 (JP) ............................... 7-206581
Jul. 19, 1995 (JP) ............................... 7-206582

(51) Int. Cl.$^7$ ..................... G02F 1/1335; C09K 19/60
(52) U.S. Cl. ................. 349/113; 349/165; 349/117
(58) Field of Search ................. 349/117, 106, 349/163

(56) References Cited

U.S. PATENT DOCUMENTS

| | | | | |
|---|---|---|---|---|
| 4,266,859 A | * | 5/1981 | Togashi | 349/113 |
| 5,179,457 A | | 1/1993 | Hirataka et al. | |
| 5,193,020 A | * | 3/1993 | Shiozaki et al. | 349/117 |
| 5,250,214 A | * | 10/1993 | Kanemoto et al. | 349/117 |
| 5,472,635 A | * | 12/1995 | Iida et al. | 349/117 |
| 5,499,126 A | * | 3/1996 | Abileah et al. | 349/117 |
| 5,578,243 A | * | 11/1996 | Mazaki et al. | 349/117 |
| 5,784,139 A | * | 7/1998 | Chigrinov et al. | 349/117 |

FOREIGN PATENT DOCUMENTS

| | | |
|---|---|---|
| EP | 0 448 124 | 9/1991 |
| EP | 0 644 439 | 3/1995 |
| EP | 0 699 938 A2 | 3/1996 |
| EP | 0 737 882 A2 | 10/1996 |
| EP | 0 737 882 | 10/1996 |
| JP | 6-222351 | * 8/1994 ................. 349/113 |

OTHER PUBLICATIONS

European Patent Office—Patents Abstracts of Japan—06222351—Oct. 8, 1994.

* cited by examiner

Primary Examiner—Toan Ton
(74) Attorney, Agent, or Firm—Sonnenschein, Nash & Rosenthal

(57) ABSTRACT

A reflective guest-host liquid-crystal display device includes a first substrate for receiving incident light, on the inner surface of which transparent electrodes are formed; a second substrate which has a reflective film formed thereon and which is spaced to face the first substrate with a predetermined spacing; an electro-optical element held between the first and second substrates, which electro-optical element has a lamination structure including a guest-host liquid-crystal layer which contains a dichroic dye and which is uniformly oriented with respect to the transparent electrode, and an optical thin-film layer which has a predetermined optical anisotropic axis and which is formed at least on the reflective film, the optical thin-film layer being formed from a polymer liquid crystal having liquid crystal molecules which are uniaxially oriented along the optical anisotropic axis; and a passivation layer which is interposed between the optical thin-film layer and the liquid crystal layer.

5 Claims, 9 Drawing Sheets

A:  (MESOGEN GROUP)

B: $-(CH_2)-n, -(CH_2-CH_2-O)n-$ (ACRYL) (METHACRYL) (METHYLSILOXANE)

FIG. IOA
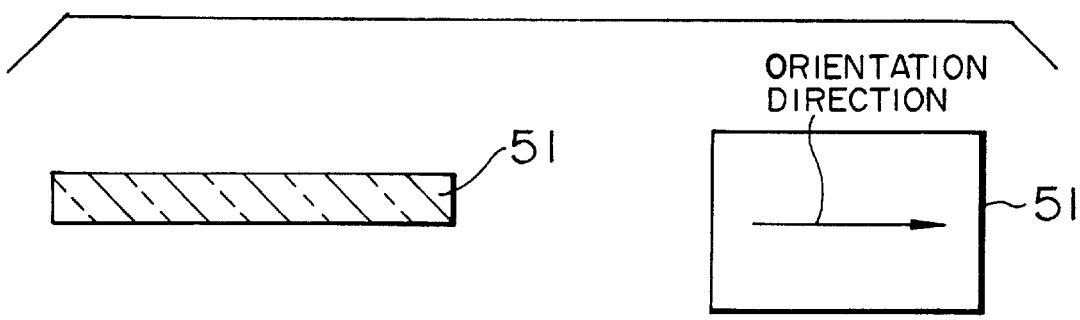
FIG. IOB
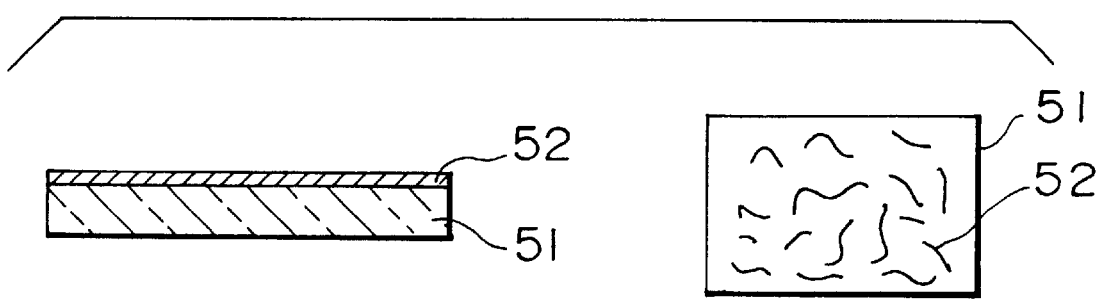
FIG. IOC
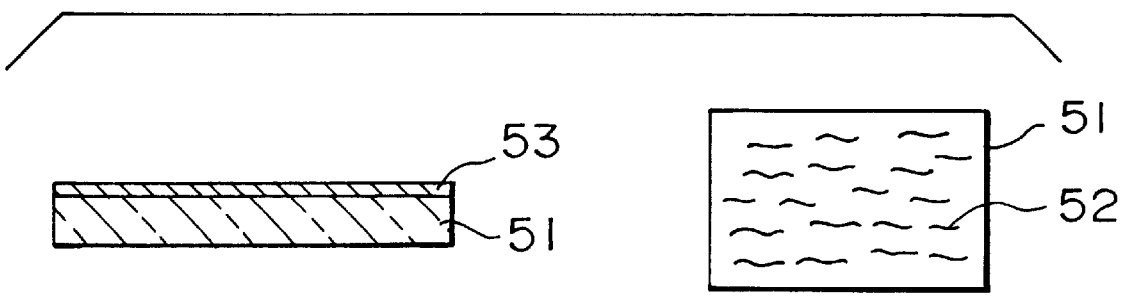

REFLECTIVE GUEST-HOST LIQUID-CRYSTAL DISPLAY DEVICE

BACKGROUND OF THE INVENTION

The present invention relates to a reflective guest-host liquid-crystal display device. More particularly, the present invention relates to technology for improving the efficiency of utilizing incident light by removing a polarizer.

Liquid-crystal display devices operate in various modes. At the present time, the dominant mode is a TN (Twisted Nematic) or STN (Super Twisted Nematic) mode in which a twist-oriented or supertwist-oriented nematic liquid crystal is used. However, in respect of operating principles, these modes require a pair of polarizers. Since light absorption occurs in the polarizers, transmittance is low, and a bright display screen cannot be obtained. In addition to these modes, a guest-host mode which uses a dichroic dye has been developed. A liquid-crystal display device of a guest-host mode makes a display by using the anisotropic properties of the absorption coefficient of the dichroic dye added to the liquid crystal. When the dichroic dye of a bar-shaped structure is used, the dye molecules have the property of being oriented parallel to the liquid crystal molecules. Therefore, when the molecule orientation of the liquid crystal is changed by applying an electric field, the orientation of the dye is also changed. Since whether or not the dye develops a color depends upon the orientation, it is possible to switch the coloring and colorless states of the liquid-crystal display device by applying a voltage.

FIGS. 7A and 7B show the structure of a Heilmeier-type guest-host liquid-crystal display device. FIG. 7A shows a state in which no voltage is applied, and FIG. 7B shows a state in which a voltage is applied. This liquid-crystal display device uses a p-type dye and a nematic liquid crystal ($N_p$ liquid crystal) whose dielectric anisotropy is positive. The p-type dichroic dye has an absorption axis which is substantially parallel to the molecular axis, and strongly absorbs polarized components Lx parallel to the molecular axis and hardly absorbs polarized components Ly perpendicular to the polarized components Lx. In the state shown in FIG. 7A in which no voltage is applied, the polarized components Lx contained in the incident light are strongly absorbed by the p-type dye, and the liquid-crystal display device is made colored. As compared with this, in the state shown in FIG. 7B in which a voltage is applied, the $N_p$ liquid crystal having positive dielectric anisotropy is turned on in response to the electric field, and in accordance with this, the p-type dye is also oriented in a perpendicular direction. For this reason, the polarized components Lx are hardly absorbed, and the liquid-crystal display device is made colorless. The other polarized components Ly which are contained in the incident light are not absorbed by the dichroic dye regardless of the voltage applied state or the voltage non-applied state. Therefore, in the Heilmeier-type guest-host liquid-crystal display device, a single polarizer is interposed beforehand to remove the other polarized components Ly.

In the guest-host liquid-crystal display device using a nematic liquid crystal, a dichroic dye which is added as a guest is oriented in the same way as the nematic liquid crystal. Although the polarized components parallel to the orientation of the liquid crystal are absorbed, the polarized components perpendicular to said first polarized components are not absorbed. Therefore, in order to obtain a sufficient contrast, a polarizer is disposed on the incident side of the liquid-crystal display device, and the polarization direction of the incident light is aligned with the orientation of the liquid crystal. However, when this is done, since 50% (actually 40% or so) of the incident light is lost in principle by the polarizer, the display becomes dark as in the TN mode. As a method of reducing this problem, the mere removal of the polarizer causes the on/off ratio of absorbance to be decreased considerably. Therefore, this is not appropriate, and various improvement measures have been proposed. For example, a construction has been proposed in which a polarizer is removed from the incident side, while a λ/4 phase shifter and a reflection plate are mounted on the emergence side. In this method, the polarization directions of two polarized components located perpendicularly to each other are rotated by 90° in the forward path and the backward path, and thus the polarized components are interchanged with each other. Therefore, in the off state (the absorption state), each polarized component will be absorbed in either the incident optical path or the reflection optical path. However, since a λ/4 phase shifter and a reflection plate are provided externally in this structure, the liquid-crystal display device itself must be made to be a transmission type. In particular, in a case in which an active matrix type structure is adopted to achieve a high resolution and to display a moving image, since thin-film transistors for driving pixel electrodes are integrated on a substrate, the pixel aperture ratio is low in the transmission type, and a considerable portion of the incident light is shut out. Therefore, even if the polarizer is removed, the screen of the display device cannot be made to be markedly bright. Meanwhile, as another measure, by making it possible to absorb all of the polarized components contained in the incident light by using a cholesteric liquid crystal, the polarizer can be removed. However, this method has a drawback in that an halftone display cannot be made due to the strong hysteresis of the cholesteric liquid crystal.

A phase shifter will now be described below.

Generally speaking, a phase shifter refers to a birefringence plate (crystal plate) for providing a predetermined optical path difference (therefore a phase difference) between linearly polarized light vibrating at mutually perpendicular directions when said light passes through a plate. When the thickness of the birefringence plate is denoted as d, the refractive index of the linearly polarized light which vibrates along the electrical principal axes perpendicular to each other as n1 and n2, the optical path difference is given as |n1−n2|. Phase shifters having optical path differences of λ/4, λ/2 and λ/1 (λ is the wavelength of the light used in a vacuum) are called a λ/4 phase shifter, a λ/2 phase shifter, and a λ/1 phase shifter, respectively, and correspond to phase shifters of π/2, π, and 2π, respectively. For example, the λ/4 phase shifter is a birefringence plate whose thickness is so determined as to introduce an optical path difference of a 1/4 wavelength between the linearly polarized light which vibrates perpendicular to each other. A thin film or the like in which a muscovite is cleaved to a proper thickness is used. Or, a synthetic resin plate or the like in which molecules are oriented in one direction is used. When linearly polarized light having a direction of 45° with respect to the principal axis is made to enter this plate, the transmitted light becomes circularly polarized light.

The λ/4 phase shifter has various uses, and in recent years, it is used in a polarization control element of a flat-panel-type display, such as a liquid-crystal display device. However, for a conventional λ/4 phase shifter, a thin film in which a muscovite is cleaved to a proper thickness, a synthetic resin plate in which molecules are oriented in one direction, or others is used. It is difficult to prepare such a λ/4 phase shifter of a large area, and the λ/4 phase shifter cannot be incorporated into a large flat panel display. Further, since the conventional λ/4 phase shifter has a considerable degree of thickness, it cannot be incorporated into the inside of a liquid-crystal cell or the like which forms a flat panel display, and serious structural limitations occur.

SUMMARY OF THE INVENTION

In order to solve the above-described problems of the prior art, a reflective guest-host liquid-crystal display device having the construction described below is proposed. That is, the basic components of the reflective guest-host liquid-crystal display device of the present invention include a first substrate for receiving incident light, on which substrate transparent electrodes are formed; a second substrate which has a reflective film formed thereon and which is positioned so as to face the first substrate with a predetermined spacing; and an electro-optical element which is held in said spacing and which performs optical modulation. The electro-optical element includes a lamination structure containing a guest-host type liquid-crystal layer which contains a dichroic dye and which is uniformly oriented with respect to the transparent electrode, and an optical thin-film layer which has a predetermined optical anisotropic axis and which is formed along the reflective film. The liquid-crystal layer changes between an absorption state and a transmission state in response to an applied voltage. In the absorption state, the liquid-crystal layer substantially absorbs first vibration components contained in the incident light, and is substantially permeable to second vibration components perpendicular to the first vibration components. In the transmission state, the liquid-crystal layer is substantially permeable to both vibration components. The optical thin-film layer is interposed in the forward and backward paths of the second vibration components reflected by the reflection electrode, the second vibration components are converted into the first vibration components and these components reenter the liquid-crystal layer in the absorption state. As a feature, in the electro-optical element, the optical thin-film layer is formed from a polymer liquid-crystal material containing liquid-crystal molecules which are uniaxially oriented along the optical anisotropic axis, and functions as a λ/4 phase shifter. In addition, the electro-optical element contains a passivation layer which is interposed between the optical thin-film layer and the liquid-crystal layer, which passivation layer physically separates the optical thin-film layer and the liquid-crystal layer from each other so as to protect the polymer liquid-crystal material.

Preferably, the passivation layer has the function of causing the liquid-crystal layer to be homeotropically oriented or homogeneously oriented. Further, preferably, the passivation layer is formed from a photosensitive material, and can be formed into a pattern by an exposure and development process. Still further, preferably, the optical thin-film layer is formed into a pattern as well with the passivation layer which is formed into a pattern as a mask. Yet still further, preferably, the optical thin-film layer contains coloring areas which are divided into the three primary colors, and a pattern is formed for each coloring area and color filters are formed.

The vibration components along the orientation direction of the liquid-crystal layer in the absorption state are absorbed by a dichroic dye which is oriented in the same direction. However, since the vibration components perpendicular to this intersect the orientation of the dye molecules, they are hardly absorbed. In other words, the vibration components hardly receive light modulation. However, according to the present invention, these vibration components pass through the liquid-crystal layer, after which they enter the optical thin-film layer. Further, after the vibration components are reflected by the reflection electrode, they pass through the optical thin-film layer again. Therefore, it follows that these vibration components have passed two times through the optical thin-film layer which functions as a λ/4 phase shifter, and their vibration direction (the polarization direction) is rotated 90°. In doing so, since the direction coincides with the orientation direction of the liquid crystal in the absorption state, these vibration components are absorbed. In this way, since all the vibration components contained in the incident light are always absorbed in either the forward path or the backward path, an external polarizer is not required. Therefore, even if the polarizer is removed, a contrast which is substantially comparable to that of a transmission-type guest-host liquid-crystal display device with a polarizer can be obtained.

In the meantime, in the present invention, a passivation layer is interposed between the optical thin-film layer and the liquid-crystal layer which constitute the above-described electro-optical element. This passivation layer physically separates the optical thin-film layer and the liquid-crystal layer from each other so as to protect the polymer liquid-crystal material. Since the optical thin-film layer formed from a polymer liquid-crystal material is separated from the guest-host type liquid-crystal layer by this passivation layer, a liquid-crystal display device which is free from mutual dissolution and having high reliability can be obtained. If this passivation layer were not interposed, the optical thin-film layer comes into direct contact with the liquid-crystal layer, and the polymer liquid-crystal material from which the optical thin-film layer is formed might be dissolved into the guest-host type liquid-crystal layer. Further, when a selection of a material for this passivation layer is appropriately made and the passivation layer is subjected to a process, such as rubbing, it is possible for the passivation layer to function as an alignment film. That is, the guest-host type liquid-crystal layer in contact with the passivation layer can be homeotropically or homogeneously oriented. There is no need to separately provide an alignment film, there is no increase in the number of steps, and the manufacturing costs can be reduced. In addition, since a photosensitive material is used as a passivation layer, patterning is possible by an exposure and development process. By using a patterned passivation layer as a mask, color filters can be formed on a substrate, making it extremely easy to cause a reflective guest-host liquid-crystal display device to make a color display. To be specific, by using the patterned passivation layer as a mask, the optical thin-film layer can be divided into coloring areas which are separated into the three primary colors, and these areas can be used as color filters.

A method of depositing a polymer liquid crystal which forms an optical thin-film layer in accordance with the present invention comprises the following steps. Initially, an orientation step is performed to orient the surface of a transparent substrate along a predetermined orientation direction. Next, a film deposition step is performed in which a polymer liquid-crystal material capable of making a phase transition between a nematic liquid-crystal phase on the high temperature side and a glass-solid phase on a low temperature side with a predetermined transition point as a boundary is deposited to a predetermined film thickness on the substrate. Finally, a heat-treating step is performed in which after the substrate is heated temporarily above the transition point, it is slowly cooled down to the room temperature below the transition point, and a uniaxial optical thin film is formed by orienting the deposited polymer liquid-crystal material along the orientation direction. By controlling the film thickness of the uniaxial optical thin film, it is possible to provide the function of the λ/4 phase shifter.

Preferably, in the orientation step, an alignment film of a polyimide film or the like is deposited on the surface of the substrate, after which the polyimide film is rubbed along the orientation direction. Still preferably, in the film deposition step, a polymer liquid-crystal material is deposited by spin coating, dipping, or printing. Yet still preferably, in the heat-treating step, a polymer liquid-crystal material having a transition point of above 100° C. and having liquid-crystal molecules introduced into the main chain or the side chain of the polymer is heated or slowly cooled.

The λ/4 phase shifter obtained in this way can be easily formed into a large area, and can be incorporated into a large flat panel display. Further, since the λ/4 phase shifter has a thin-film structure, it is possible to easily incorporate it into the inside of a liquid-crystal cell or the like which forms a flat panel display.

The above and further objects, aspects and novel features of the invention will become more apparent from the following detailed description when read in connection with the accompanying drawings.

BRIEF DESCRIPTION OF THE DRAWINGS

FIGS. 10A, 10B and 10C are process charts illustrating the best mode of a method of depositing a polymer liquid crystal according to the present invention.

DESCRIPTION OF THE PREFERRED EMBODIMENTS

Figure 1A:
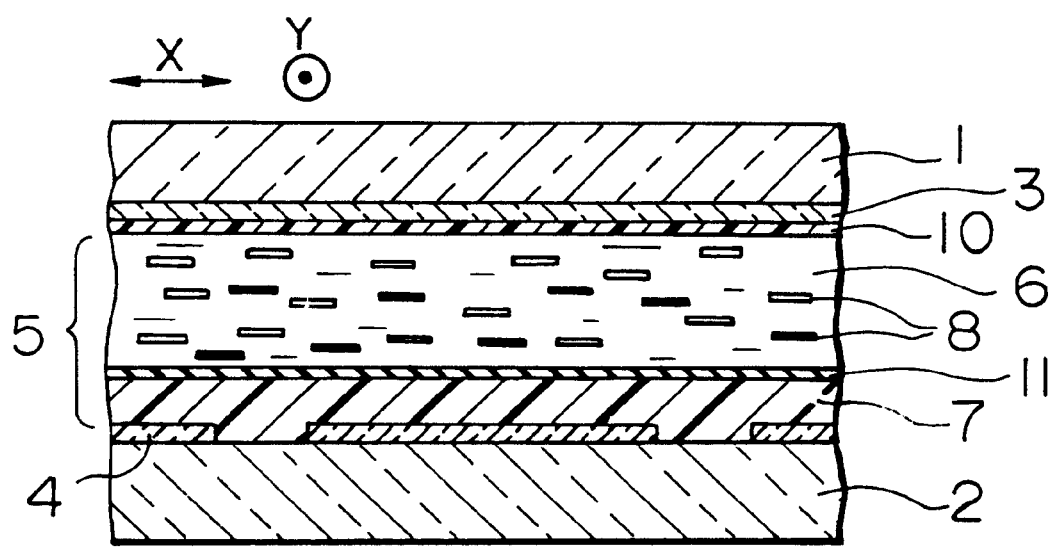
FIGS. 1A and 1B are a sectional view and a plan view illustrating the best mode of a reflective guest-host liquid-crystal display device according to the present invention.
Figure 1B:
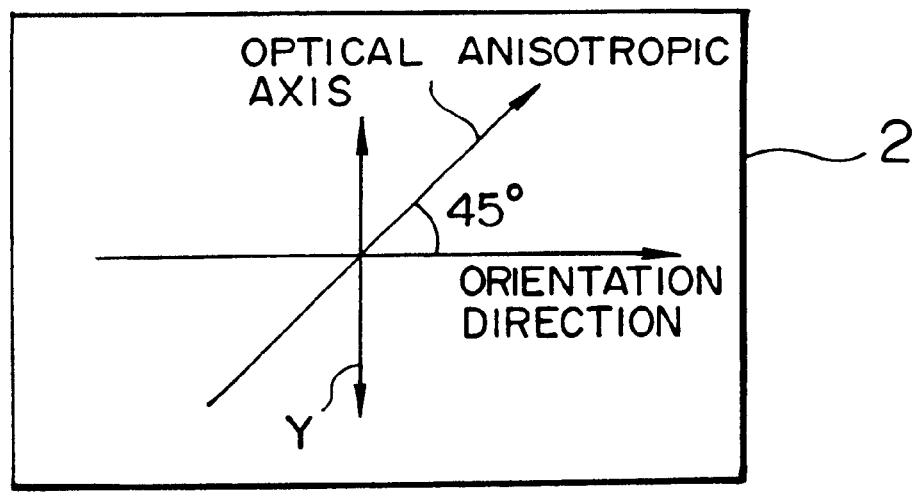

FIGS. 1A and 1B show the best mode of an embodiment of a reflective guest-host liquid-crystal display device according to the present invention. As shown in FIG. 1A, this device is assembled by using an upper substrate 1 and a lower substrate 2. The upper substrate 1 is made of glass or the like, and is formed with a transparent electrode 3 so as to receive incident light. This transparent electrode 3 is, for example, patterned in a stripe shape along the row direction. Formed on the lower substrate 2 is a reflection electrode 4. The reflection electrode 4 is, for example, patterned in a stripe shape along the column direction. Therefore, the transparent electrode 3 and the reflection electrode 4 intersect each other in a matrix form, and a simple matrix-type liquid-crystal display device is obtained. The lower substrate 2 is positioned so as to face the upper substrate 1 with a predetermined spacing. An electro-optical element 5 is held in this spacing and performs optical modulation in response to a voltage applied between the transparent electrode 3 and the reflection electrode 4. The electro-optical element 5 has a lamination structure including a guest-host type liquid-crystal layer 6 and an optical thin-film layer 7. The guest-host-type liquid crystal layer 6 contains a dichroic dye 8 and is uniformly oriented along the transparent electrode 3. The optical thin-film layer 7 has a predetermined optical anisotropic axis and is formed along the reflection electrode 4.

Figure 6A:
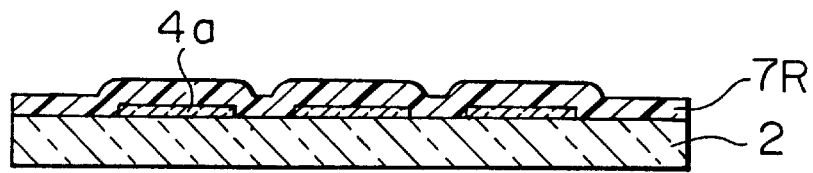
FIGS. 6A, 6B, 6C, 6D and 6E are process charts illustrating a method of manufacturing the reflective guest-host liquid-crystal display device shown in FIG. 5.
Figure 6B:
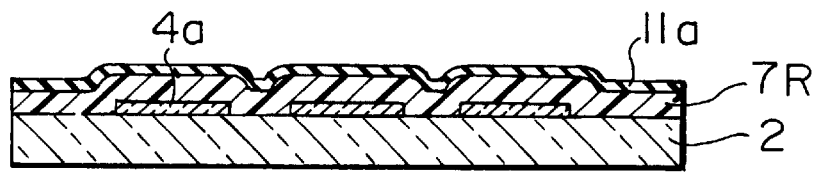
Figure 6C:
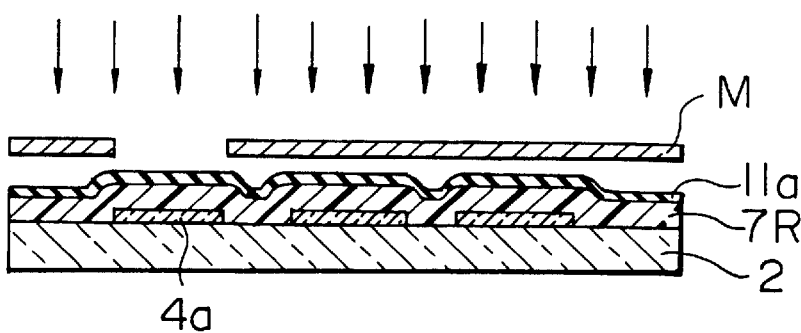
Figure 6D:
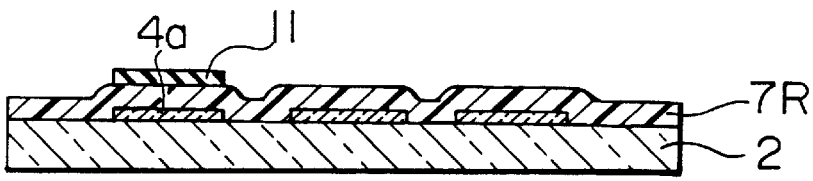
Figure 6E:
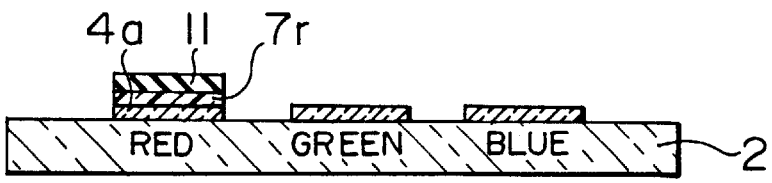
Figure 7A:
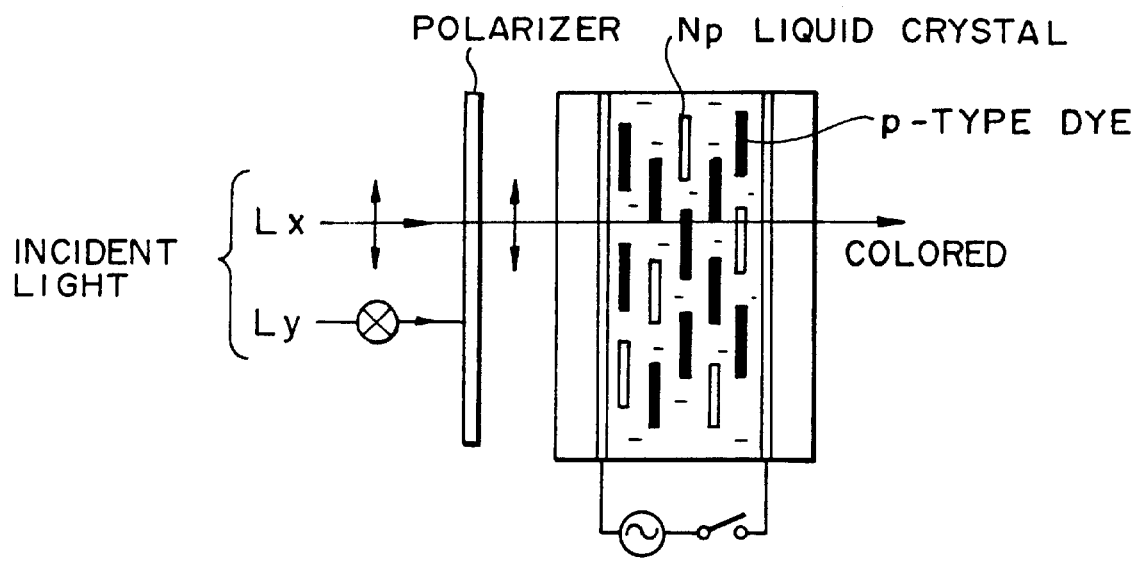
FIGS. 7A and 7B are sectional views illustrating a conventional reflective guest-host liquid-crystal display device.
Figure 7B:
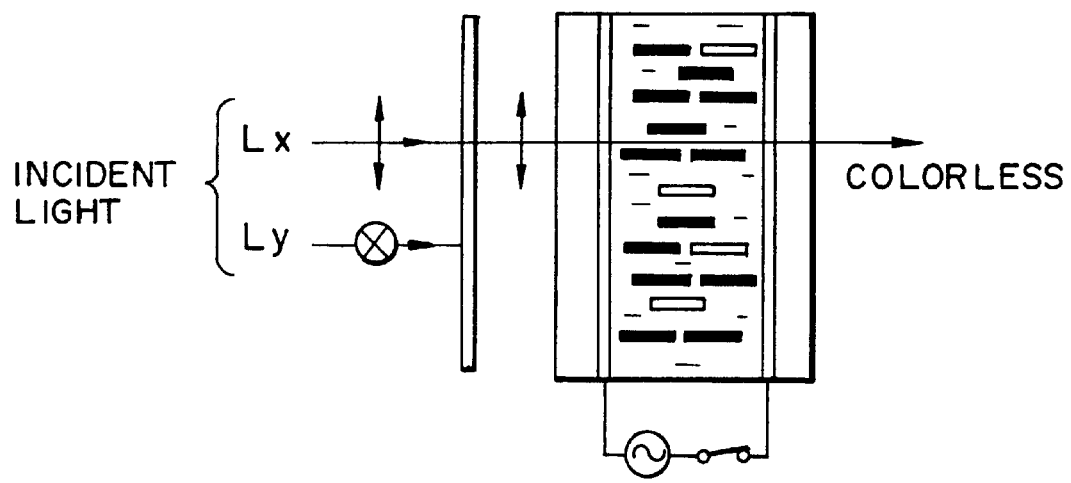

The liquid crystal layer 6 changes between an absorption state and a transmission state. FIG. 6A shows an absorption state in which first vibration components X contained in the incident light are substantially absorbed, and second vibration components Y perpendicular to the first vibration components X are substantially passed through. In contrast, in the transmission state, both vibration components X and Y are substantially passed through. As shown in the figure, in the absorption state, nematic liquid-crystal molecules 9 are horizontally oriented, and in accordance with this, the dichroic dye 8 is also horizontally oriented. In this example, an absorption state is realized with no application of voltage, and the liquid-crystal layer 6 changes to a transmission state with the application of voltage. For this reason, the nematic liquid-crystal molecules 9 have positive dielectric anisotropy and are controlled at a horizontal orientation (homogeneous orientation) beforehand. On the contrary, the absorption state shown in the figure can also be realized with the application of a voltage. In this case, nematic liquid-crystal molecules 9 having negative dielectric anisotropy are used. In such a structure, the optical thin-film layer 7 is interposed in the forward and backward paths of the second vibration components Y which are reflected by the reflection electrode 4, the second vibration components Y are converted into the first vibration components X, and these components reenter the liquid-crystal layer 6 in the absorption state.

The optical thin-film layer 7 functions as a λ/4 phase shifter. As shown in FIG. 1B, the optical anisotropic axis thereof intersects the orientation direction of the liquid crystal layer in the absorption state at an angle of 45°. The direction of the vibrations of the second vibration components Y (the linearly polarized light components) which have passed through the absorption state is perpendicular to the orientation direction. Further, the second vibration components Y intersect the optical anisotropic axis at an angle of 45°. When the second vibration components Y (the linearly polarized light components) are passed through the λ/4 phase shifter, they are converted into circularly polarized light. When this circularly polarized light enters the λ/4 phase shifter again after being reflected by the reflection electrode, it is converted into linearly polarized light (the first vibration components X) which is perpendicular to the second vibration components Y. The first vibration components X which are converted in this way will be absorbed by the liquid crystal layer 6 in the absorption state.

As a feature of the present invention, in the electro-optical element 5, the optical thin-film layer 7 is formed from a polymer liquid-crystal material containing liquid-crystal molecules which are uniaxially oriented along the optical anisotropic axis. The electro-optical element 5 further includes a passivation layer 11 which is interposed between the optical thin-film layer 7 and the liquid-crystal layer 6, which passivation layer 11 physically separates them so as to protect the polymer liquid-crystal material. Since the optical thin-film layer 7 is spaced apart from the liquid-crystal layer 6, a display device free from mutual dissolution and having high reliability can be obtained. In addition, this passivation layer 11 has the function of causing the liquid-crystal layer to be homeotropically oriented or homogeneously oriented. In this example, the liquid crystal layer 6 is homogeneously oriented at an angle difference of 45° with respect to the optical anisotropic axis. Besides, an alignment film 10 is formed also on the inner surface of the upper substrate 1, and a desired homogeneous orientation is realized by causing the liquid-crystal layer 6 to be held from above and below by the alignment film 10 and the passivation layer 11 having an orientation function. In some cases, a photosensitive material may be used for the passivation layer 11, and this layer can be patterned by an exposure and development process. In this case, the optical thin-film layer 7 can be patterned similarly with the patterned passivation layer 11 as a mask. For example, by selectively removing the passivation layer 11 from the peripheral portion of the lower substrate 2, the sealing properties with respect to the upper substrate 1 can be made excellent. In addition, when this liquid-crystal display device is formed into a color display device, it is possible to form the optical thin-film layer 7 into patterns in order to provide coloring areas which are divided into the three primary colors. That is, it is also possible for the optical thin-film layer 7 to be formed into patterns for each coloring area in order to form color filters.

Figure 2:
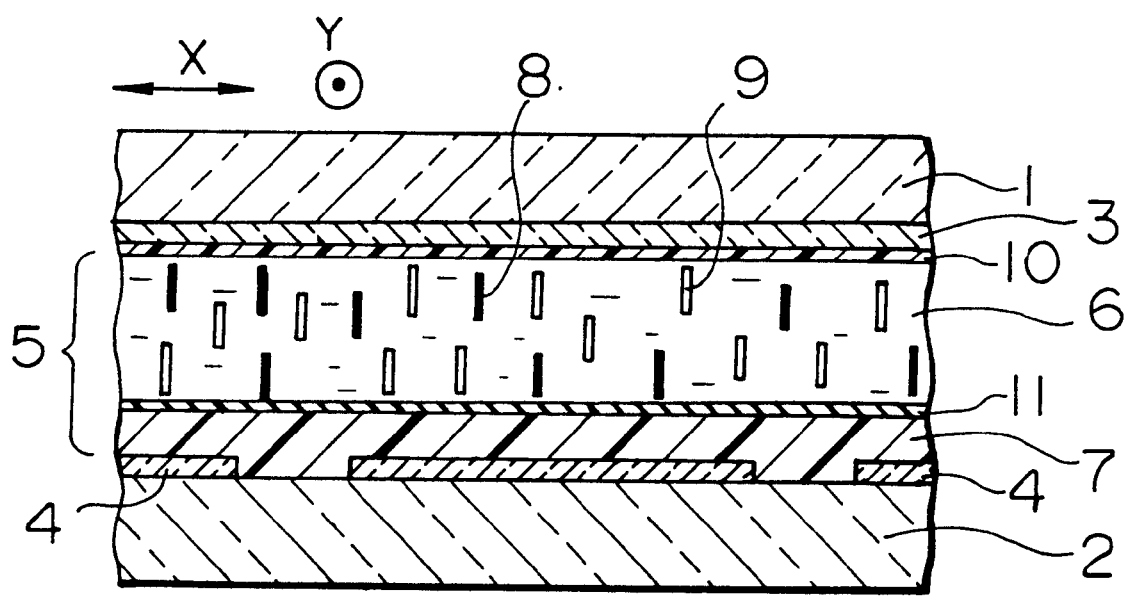
FIG. 2 is a sectional view illustrating the operation of the reflective guest-host liquid-crystal display device shown in FIG. 1.
Figure 3A:
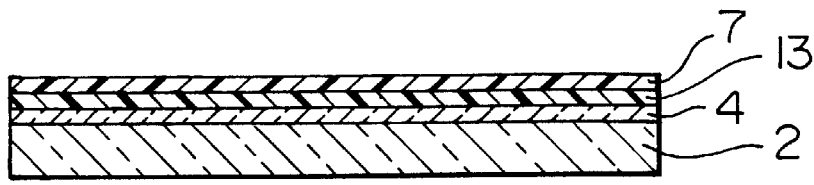
FIGS. 3A, 3B, 3C, 3D and 3E are process charts illustrating the method of depositing an optical thin-film layer and a passivation layer which are incorporated into the reflective guest-host liquid-crystal display device shown in FIG. 1.
Figure 3B:
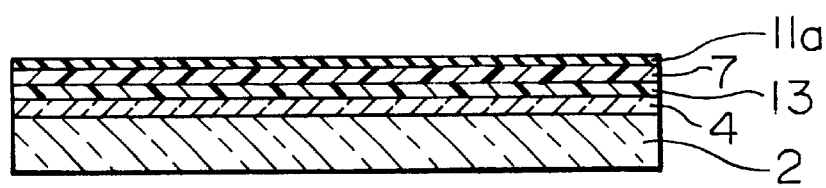
Figure 3C:
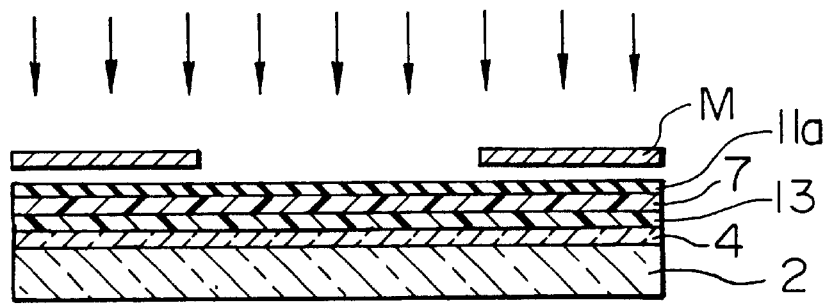
Figure 3D:
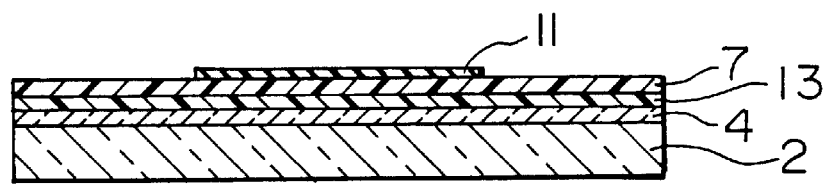
Figure 3E:
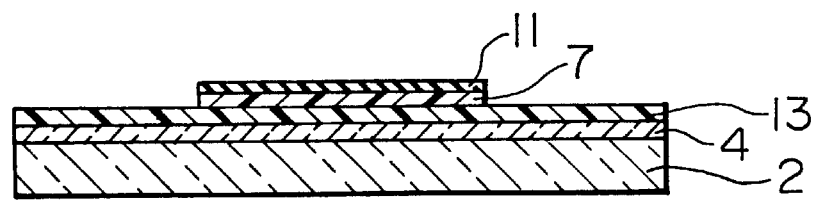

FIG. 2 shows the transmission state of the liquid-crystal layer 6, in which the nematic liquid-crystal molecules 9 are vertically oriented. In accordance with this, the dichroic dye 8 is also oriented vertically. Therefore, both the first vibration components X and the second vibration components Y practically completely pass through the liquid-crystal layer 6. In the reflected light, the first vibration components and the second vibration components are only interchanged with each other, and the reflected light does not undergo light modulation whatsoever. The nematic liquid-crystal molecules 9 whose dielectric anisotropy is positive are turned on in response to the applied voltage, and change to vertical orientation. Further, as described above, it is also possible to realize vertical orientation of the nematic liquid-crystal molecules 9 without the application of a voltage. That is, by appropriately selecting a material or the like for the alignment film 10 and the passivation layer 11, it is possible to cause the nematic liquid-crystal molecules 9 to be vertically oriented (homeotropically oriented). In this case, nematic liquid-crystal molecules 9 whose dielectric anisotropy is negative are used, and are changed to horizontal orientation in response to the application of a voltage. At this time, in order to make the horizontal orientation direction constant, the nematic liquid-crystal molecules 9 are provided with a pretilt beforehand in the vertical orientation state. In any case, it is necessary to form the alignment film 10 on the optical thin-film layer 7 and to control the orientation state of the liquid crystal layer 6. For example, if a polyimide film or a polyvinyl alcohol film is formed on the surface of the optical thin-film layer 7 and is subjected to a rubbing process, a desired homogeneous orientation can be obtained. Or, in place of this process, the surface of the optical thin-film layer 7 may be directly rubbed. However, the rubbing direction is set so as to be inclined 45° with respect to the optical axis of the optical thin-film layer 7.

Next, referring to FIGS. 1 and 2, a specific structure of the best mode of the embodiment will be described in detail. In this liquid-crystal display device, the liquid crystal layer 6 is composed of the nematic liquid-crystal molecules 9, with a black or color dichroic dye 8 being added therein. The liquid crystal layer 6 having the dichroic dye 8 mixed therein is horizontally or vertically oriented. The reflection electrode 4 is made of a metal film having a high reflectance, such as aluminum or silver. Therefore, this display device is formed into a reflective display. Formed on the reflection electrode 4 is a transparent optical thin-film layer 7 which is capable of providing a phase difference of $\lambda/4$ with respect to the wavelength of the visible region (400 to 700 nm). When the liquid crystal layer 6 is horizontally oriented, the optical anisotropic axis of the optical thin-film layer 7 is designed to make an angle of 45° with respect to the orientation direction of the liquid-crystal layer 6. When the liquid crystal layer 6 is vertically oriented beforehand, the optical anisotropic axis is set so as to have an angle of 45° with respect to the cosine direction of the liquid-crystal molecules 9 having a pretilt angle. The optical thin-film layer 7 is formed from a polymer liquid-crystal material containing liquid crystal molecules which are uniaxially oriented along the optical anisotropic axis. For example, a polymer liquid-crystal material (aromatic polyester which is a liquid crystalline polymer, a siloxane resin or the like) is used, and is aligned on a substrate at a temperature of the nematic phase or the smectic A phase, after which it is returned to room temperature and fixed. Thus, an optical thin-film layer 7 having uniaxial anisotropy can be obtained. When a $\lambda/4$ layer is formed by using a polymer liquid-crystal material having a high refractive index anisotropy ($\Delta n$), its film thickness can be made sufficiently thin. Therefore, since the $\lambda/4$ layer can be coated on the reflection electrode, the process of manufacturing the display device can be simplified. The passivation layer 11 is interposed between the optical thin-film layer 7 and the liquid-crystal layer 6. For the passivation layer, a photosensitive material may be used, so that it can be patterned by exposure and development. For the photosensitive material, an aqueous solution of polyvinyl alcohol (PVA), to which is added a very small amount of ammon bichromate for causing an photocrosslinking reaction to occur may be used, and this material can be coated on a substrate by spin coating or the like. PVA has excellent orientation properties for the liquid-crystal layer 6, and is suitable as the passivation layer 11.

Next, referring to FIGS. 1 and 2, the operation of the reflective guest-host liquid-crystal display device of the present invention will be described in detail. A case will be considered in which light enters from outside in the horizontal orientation state shown in FIG. 1A. First, the incident light can be considered by separating it into the first oscillation components X and the second oscillation components Y. Since the first oscillation components X are in the same orientation direction as that of the liquid-crystal layer 6, they are absorbed by the dichroic dye 8 which is oriented in the same direction. However, since the second oscillation components Y are perpendicular to the orientation direction of the dye molecules, they are not absorbed at all. Therefore, the second oscillation components Y pass through the liquid-crystal layer 6, and further enter the optical thin-film layer 7 which functions as a $\lambda/4$ phase shifter. Further, the second oscillation components Y are reflected by the reflection electrode 4 and pass through the optical thin-film layer 7 again. It follows that the second oscillation components Y have passed two times through the optical thin-film layer 7 in respect of the forward and backward paths, and their polarization direction is rotated 90°. Therefore, since, this time, the polarization direction coincides with the orientation direction of the liquid-crystal layer 6, light is absorbed. In this way, since all of the vibration components contained in the incident light are absorbed in either the forward path or the backward path, a contrast comparable to that of a transmission-type guest-host liquid-crystal display device with a polarizer can be obtained without a polarizer.

Referring to FIG. 3, an embodiment of depositing the optical thin-film layer 7 and the passivation layer 11 will be described in detail. Initially, in step (FIG. 3A), after the substrate 2 made of glass or the like is cleaned, a metallic film is formed on the surface thereof by a sputtering process or a vacuum deposition process. This metallic film is patterned into a predetermined form and processed into the reflection electrode 4. Next, the top of the reflection electrode 4 is covered with a base alignment film 13. This base alignment film 13 is subjected to a rubbing process along a predetermined direction. Further, a polymer liquid-crystal material is coated on the base alignment film 13. This polymer liquid crystal is a polymer liquid crystal of a side chain type in which, for example, mesogen of an ester benzoate type is formed into a pendant. 3 to 5 wt. % of this polymer liquid crystal is dissolved into a solution in which cyclohexane and methyl ethyl ketone are mixed at a ratio of 8:2. This solution is spin-coated at a rotation speed of, for example, 1,000 rpm, causing a polymer liquid crystal to be deposited on the glass substrate 2. Thereafter, the substrate is heated to a temperature at which the polymer liquid crystal temporarily reaches an optically isotropic state. Then, the heating temperature is slowly decreased for the substrate to pass through the nematic phase and to return to the room temperature state. In the nematic phase, the polymer liquid crystal is oriented along the rubbing direction of the base alignment film 13, and a desired uniaxial orientation property can be obtained. This uniaxial orientation state is fixed by returning the substrate 2 to room temperature. With such an annealing process, the liquid-crystal molecules contained in the polymer liquid-crystal material are uniaxially oriented, and a desired optical thin-film layer 7 can be obtained.

The process proceeds to step (FIG. 3B) where a photosensitive material 11a is coated on the optical thin-film layer 7. For example, an aqueous solution (0.1 to 5 wt. %) of PVA is spin-coated. At this time, in order to cause a photo-crosslinking reaction of PVA to occur in the aqueous solution, for example, a very small amount of ammon bichromate is added beforehand. Next, the process proceeds to step (FIG. 3C) where an exposure process is performed by a mercury lamp or a xenon lamp by using a desired mask M. Further, the process proceeds to step (FIG. 3D) where when a water washing process is performed, that portion of the photosensitive material 11a which is not exposed dissolves into water, and the passivation layer 11 formed from the polymer of patterned PVA is formed. Finally, in step (FIG. 3E), when the substrate 2 is soaked into n-butanone by using this passivation layer 11 as a mask, that portion of the optical thin-film layer 7 which is not covered with the passivation layer 11 is dissolved and patterned. For example, in a case in which a liquid-crystal display device is assembled, upper and lower substrates must be bonded to each other by a bonding agent. In this case, by previously removing the optical thin-film layer 7 from the sealing area in the periphery of the substrate 2, a sealing structure having high reliability can be obtained. Or, in a case in which conduction between upper and lower substrates is to be made, it is necessary to selectively remove the optical thin-film layer 7 from the contact portion. By rubbing this passivation layer 11 along a predetermined direction, the horizontal orientation of the guest-host liquid-crystal layer in contact with the optical thin-film layer 7 is realized, and is interposed between the polymer liquid crystal and the guest-host liquid crystal and acts as a blocking layer between them. The rubbing direction of the passivation layer 11 and the rubbing direction of the base alignment film 13 intersect each other at-an angle of 45°.

Figure 4:
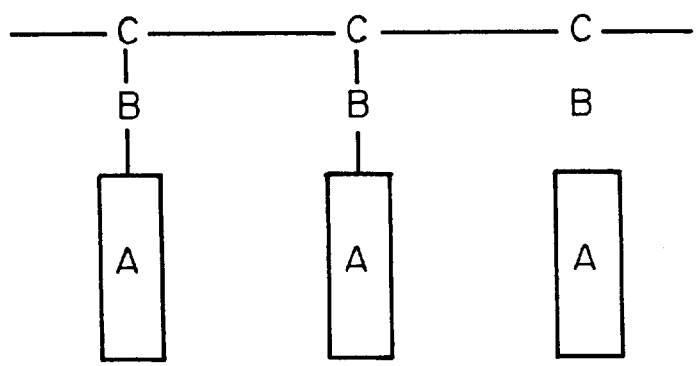
FIGS. 4A, 4B and 4C are chemical structure views illustrating an example of a polymer liquid-crystal material from which the optical thin-film layer is formed.
Figure 4:
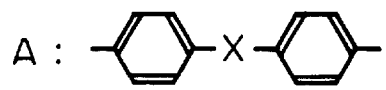
Figure 4:
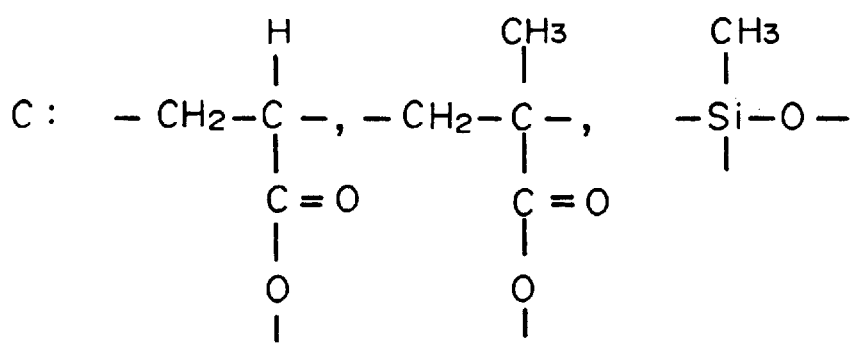

Referring to FIG. 4, an example of the polymer liquid crystal will be described. As shown in the figure, the polymer liquid crystal contains a rigid mesogen group (the liquid-crystal forming group) A which is the same as the chemical structure of the core portion in a low-molecule liquid crystal. This mesogen group A is connected to the main chain C of a polymer having the repeating units of acryl, methacryl or methylsiloxane via a flexible side chain B (e.g., a polyethylene chain or polyoxyethylene chain). Such structure is called a side-chain-type polymer liquid crystal of a pendant type. This polymer liquid crystal exhibits a nematic, a smectic and a cholesteric phase in the same way as in a low-molecule liquid crystal due to its structure element. The liquid-crystal temperature range thereof is generally present on the higher temperature side than in the low-molecule liquid crystal, and the phase transition temperature increases with the molecular weight. When siloxane coupling is introduced into the skeleton main chain of the side-chain-type polymer liquid crystal, the liquid-crystal temperature range can be decreased.

Figure 5:
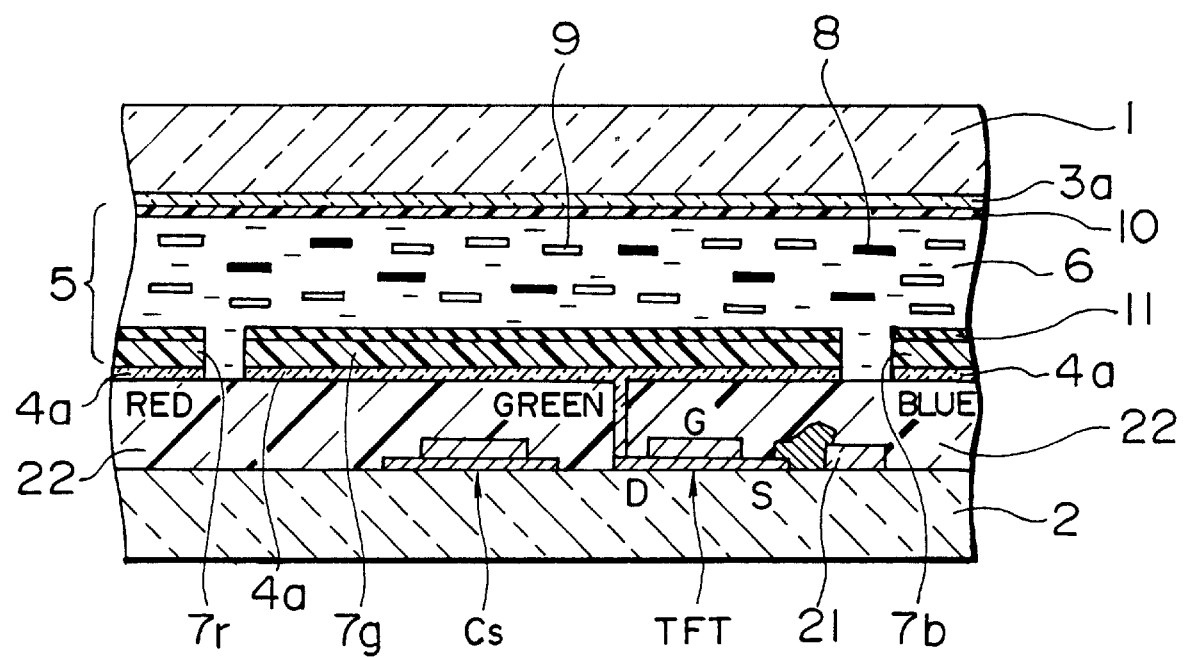
FIG. 5 is a schematic partial sectional view illustrating a preferred embodiment of the reflective guest-host liquid-crystal display device according to the present invention.

FIG. 5 is a schematic partial sectional view illustrating an embodiment of a reflective guest-host liquid-crystal display device of the present invention. Basically, it has the same structure of the best mode shown in FIG. 1. Corresponding components are given corresponding reference numerals so as to facilitate understanding. As shown in the figure, the upper substrate 1 includes an opposing electrode 3a formed of a transparent electrode formed on the entire surface, and the lower substrate 2 includes a pixel electrode 4a formed of a reflection electrode which is divided into small regions in a matrix form. That is, whereas the former example is a simple matrix type, this embodiment is an active matrix type. In addition to a pixel electrode 4a patterned in a matrix form, thin-film transistor TFTs, in correspondence with the pixel electrodes 4a, are also integrated on the inner surface of the lower substrate 2. These TFT serve as switching elements for driving the pixel electrodes 4a individually. That is, by selectively controlling the on/off of this TFT, a signal voltage is written in a corresponding pixel electrode 4a. The drain region D of the TFT is connected to the pixel electrode 4a, and the source region S is connected to a signal line 21. The gate electrode G of the TFT is connected to the gate line. Further, a holding capacitor Cs is also formed in correspondence with each pixel electrode 4a. The pixel electrode 4a is electrically separated by a planarized film 22 from the TFT, the holding capacitor Cs and the signal line 21. On the other hand, an opposing electrode 3a is formed on the entire surface of the inner surface of the upper substrate 1. The electro-optical element 5 is held in the spacing between the two substrates 1 and 2 which are spaced to face each other with a predetermined spacing. When a signal voltage is written in the pixel electrode 4a, an electric field is generated in the space adjoining the opposing electrode 3a, and the electro-optical element 5 changes between the absorption state and the transmission state. Since this optical change appears for each pixel electrode, a desired image display can be made. Disposed below the pixel electrode 4a are the TFT, the holding capacitor Cs, the signal line 21, and the like. Since these components are not interposed in the incident light path, they do not exert an influence upon the pixel aperture ratio. In other words, the screen of the pixel electrode 4a can be used as a pixel aperture as it is, and a very bright display can be made.

As a feature, the guest-host type liquid crystal layer 6 and the optical thin-film layer 7 which constitute the electro-optical element 5 are separated from each other by the passivation layer 11. The passivation layer 11 is made of a photosensitive material, and is patterned in alignment with the pixel electrode 4a by an exposure and development process. The optical thin-film layer 7 is similarly patterned for each pixel electrode 4a with such patterned passivation layer 11 as a mask. In this example, the patterned optical thin-film layer 7 includes coloring regions 7r, 7g and 7b which are separated into red, green and blue, and color filters are formed in alignment with pixel electrodes 4a corresponding to each coloring region.

FIG. 6 is a process chart illustrating a method of manufacturing a color filter shown in FIG. 5. Initially, in step (FIG. 6A), the pixel electrode 4a is patterned on the substrate 2. After the surface thereof is subjected to an orientation process, an optical thin-film layer 7R is deposited. In this example, to form a color filter made of the three primary colors of red, green and blue, the optical thin-film layer 7R which was previously colored red is used. For example, a substituent which absorbs red wavelength components is introduced into the side chain of a polymer material which forms the optical thin-film layer. Or, a normal red dye which does not show a dichroic property may be mixed into the liquid-crystal polymer material. The optical thin-film layer 7R which was previously colored red in this way is deposited on the substrate 2. This specific film deposition method is the same as the film deposition method shown in FIG. 3. Next, in step (FIG. 6B), the photosensitive material 11a is coated on the red optical thin-film layer 7R. In step (FIG. 6C), the photosensitive material 11a is exposed via the mask M. In step (FIG. 6D), the substrate 2 is washed with water, the unexposed portion of the photosensitive material 11a is dissolved and removed, and a development process is performed. As a result, the passivation layer 11 which is patterned in alignment with the specific pixel electrode 4a is formed. In step (FIG. 6E), the red optical thin-film layer 7R is etched with the passivation layer 11 as a mask, and is processed to a red region 7r which is brought into alignment with the pixel electrode 4a. Hereinafter, in the same way as described above, the green region and the blue region can be formed on the respectively corresponding pixel electrode 4a. Although in this embodiment color filters are formed by using the three primary colors of red, green and blue of the additive process, the present invention is not limited to this example. Color filters which use the three primary colors of yellow, magenta and cyan of the subtractive process may be formed.

Figure 8:
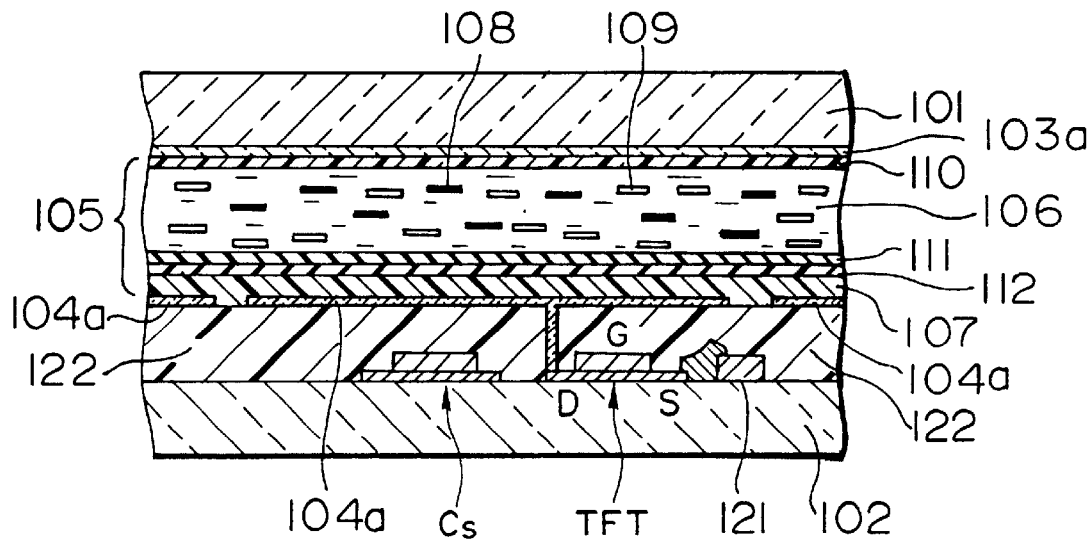
FIG. 8 is a schematic partial sectional view illustrating another embodiment of the present invention.

FIG. 8 is a schematic partial sectional view illustrating another embodiment of the reflective guest-host liquid-crystal display device. As shown in FIG. 8, an upper substrate 101 includes an opposing electrode 103a formed of a transparent electrode formed all over the surface, and a lower substrate 102 includes a pixel electrode 104a formed of a reflection electrode which is divided into small regions in a matrix form. In addition to a pixel electrode 104a patterned in a matrix form, thin-film transistors TFT, in correspondence with the pixel electrodes 104a, are also integrated on the inner surface of the lower substrate 102. These TFTs serve as switching elements for driving the pixel electrodes 104a individually. That is, by selectively controlling the on/off of this TFT, a signal voltage is written in a corresponding pixel electrode 104a. The drain region D of the TFT is connected to the pixel electrode 104a, and the source region S is connected to a signal line 121. The gate electrode G of the TFT is connected to the gate line. Further, a holding capacitor Cs is also formed in correspondence with each pixel electrode 104a. The pixel electrode 104a is electrically separated by a planarized film 122 from the TFT, the holding capacitor Cs and the signal line 121. On the other hand, an opposing electrode 103a is formed on the entire surface of the inner surface of the upper substrate 101. The electro-optical element 105 is held in the spacing between the two substrates 101 and 102 which are spaced to face each other with a predetermined spacing. The electro-optical element 105 has a lamination structure including a guest-host liquid-crystal layer 106 and an optical thin-film layer 107. When a signal voltage is written in the pixel electrode 104a, an electric field is generated in the space adjoining the facing opposing electrode 103a, and the electro-optical element 105 changes between the absorption state and the transmission state. Since this optical change appears for each pixel electrode, a desired image display can be made. Disposed below the pixel electrode 104a are the TFT, the holding capacitor Cs, the signal line 121, and the like. Since these components are not interposed in the incident light path, they do not exert an influence upon the pixel aperture ratio. In other words, the screen of the pixel electrode 104a can be used as a pixel aperture as it is, and a very bright display can be made.

In this embodiment, a passivation film 112 is formed between a uniaxial optical thin-film layer 107 and an alignment film 111. If the passivation film is formed by a film having an orientation function, the alignment film need not be further provided.

Figure 9:
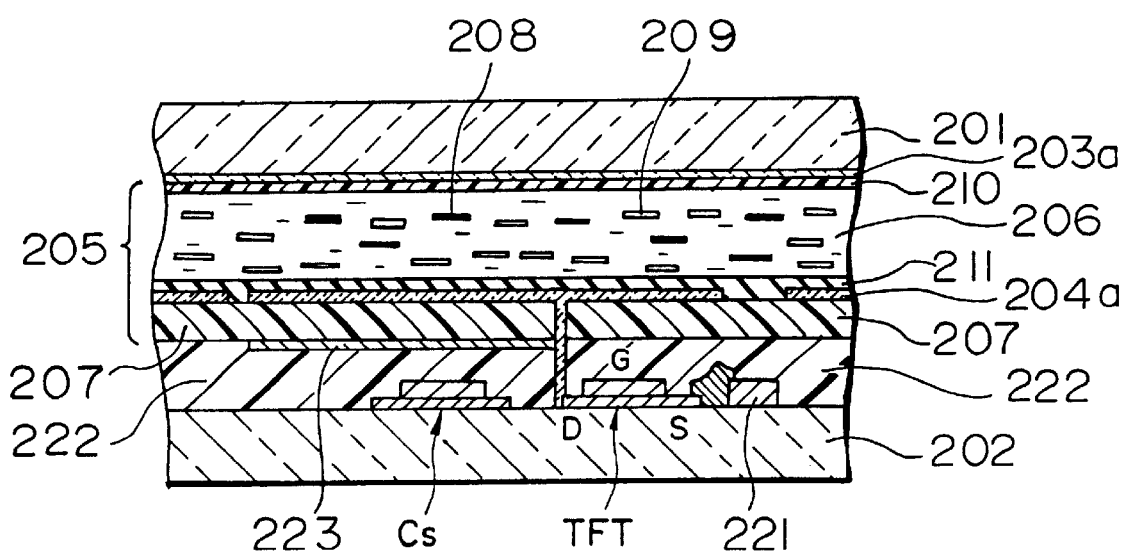
FIG. 9 is a schematic partial sectional view illustrating yet another embodiment of the present invention.

FIG. 9 is a schematic partial sectional view illustrating yet another embodiment of a reflective guest-host liquid-crystal display device. As shown in FIG. 9, an upper substrate 201 includes an opposing electrode 203a formed of a transparent electrode formed on the entire surface of the inner surface of an upper substrate 201, and a lower substrate 202 includes a pixel electrode 204a formed in a matrix form. In addition to the pixel electrodes 204a patterned in a matrix form, thin-film transistor TFTs for driving each of the pixel electrodes are integrated on the inner surface of the lower substrate. The drain region D of the TFT is connected to the pixel electrode 204a, and the source region S is connected to a signal line 221. In this embodiment, after a planarized film 222 is formed, an Al reflective film 223 is formed, and a uniaxial optical optical thin-film layer 207 is formed thereon. A passivation film 211 having an orientation function is formed on the pixel electrode 204a. An electro-optical element 205 has a lamination structure including a guest-host liquid-crystal display device 208 and the optical thin-film layer 207.

A description will be given of a method of depositing an optical thin film formed of a liquid-crystal polymer common to the above-described reflective guest-host liquid-crystal display device.

Referring to FIG. 10, the best mode of a polymer liquid crystal deposition method in accordance with the present invention will be described. The polymer liquid-crystal deposition method of the present invention is concerned with the formation of a uniaxial optical thin film for introducing a phase difference of $\lambda/4$. This embodiment is a simple film deposition process for a substrate. However, this polymer liquid-crystal deposition method can be applied to, for example, the manufacture of a liquid-crystal flat panel display, and the liquid crystal cell can be applied to any of a simple matrix type, an active matrix type, and a segment type.

Initially, an orientation step (FIG. 10A) is performed in which the surface of a transparent substrate 51 of glass or the like is oriented along a predetermined orientation. For example, after a polyimide film is deposited on the surface of the substrate 51, this polyimide film may be rubbed along the orientation direction. In some cases, the surface of the substrate 51 may be directly rubbed.

Next, a film deposition step (FIG. 10B) is performed in which a film deposition material formed of a polymer liquid crystal 52 is deposited to a predetermined film thickness on the substrate 51. This polymer liquid crystal is a material which is capable of making a phase transition between a nematic liquid-crystal phase on the high temperature side and the glass-solid phase on the low temperature side with a predetermined transition point as a boundary. For example, this polymer liquid crystal 52 is in a glass state at room temperature, and is preferably a main-chain type or a side-chain type having a transition point at 100° C. or above. This polymer liquid crystal is a transparent material such from an optical point of view that no light absorption occurs in the visible region. After this polymer liquid crystal is dissolved in an organic solvent (e.g., a mixed solution of cyclohexane and n-butanone), it is coated on the surface of the upper substrate 51 by spin coating. Instead of spin coating, it may be coated on the surface of the substrate 51 by using dipping, screen printing or the like. When spin coating is performed, by appropriately setting conditions, such as the concentration of the solution or the number of spin rotations, the film thickness of a thin film to be formed causes a phase difference of $\lambda/4$ to occur in the visible region.

Finally, a heat-treating step (FIG. 10C) is performed in which after the substrate 51 is heated temporarily to above the transition point, it is slowly cooled to room temperature below the transition point, the deposited polymer liquid crystal 52 is oriented in the orientation direction, and thus a uniaxial optical thin film 53 is formed. A polymer liquid-crystal material having a transition point of above 100° C. and having liquid-crystal molecules introduced into the main chain or the side chain of the polymer is heated or slowly cooled. As shown in FIG. 10C, whereas in the film deposition stage, the liquid-crystal molecules contained in the polymer liquid crystal 52 are in a randomly oriented state, after slow cooling, the liquid-crystal molecules are oriented along the orientation direction and the desired uniaxial optical anisotropy can be obtained. To be specific, the substrate 51 having the polymer liquid crystal 52 deposited thereon is put into an oven which has been previously set at a nematic phase temperature or an isotropic phase temperature and is heated. Thereafter, it is slowly cooled and returned to room temperature. As a result, the coated polymer liquid crystal 52 is oriented along the orientation direction of the substrate 51 which has been previously oriented.

In the above-described way, by controlling the film thickness of the uniaxial optical thin film 53, the function of the $\lambda/4$ phase shifter can be provided. For example, if the wavelength $\lambda$ of the incident light is set at the substantially central value 500 nm of the visible region when the refractive index anisotropy $\Delta n$ of the uniaxial optical thin film 53 is 0.2, the film thickness d is calculated as $\lambda/4 \cdot \Delta n = 500$ nm/4×0.2=620 nm. That is, by performing control so that the film thickness d of the polymer liquid crystal 52 becomes 620 nm in a state in which the heat-treating step is completed, the function of the $\lambda/4$ phase shifter can be shown with respect to the incident light beams of the substantially visible region.

As has been described up to this point, according to the present invention, a reflection electrode is formed inside a guest-host liquid-crystal display device in order to make it a reflection type, and an optical thin-film layer which functions as a $\lambda/4$ phase shifter is formed on the reflection electrode. The optical anisotropic axis (the optical principal axis) thereof is set so as to be inclined 45° with respect to the orientation direction of the guest-host liquid crystal. With such a construction, a bright reflective liquid-crystal display device which does not require a polarizer and which has a high contrast is made possible. In particular, since a passivation layer is interposed between the guest-host liquid crystal and the optical thin-film layer, a liquid-crystal display device which is free from mutual dissolution and has high reliability can be obtained. Further, by imparting a liquid-crystal orientation function to such passivation layer, the manufacturing costs can be reduced without increasing the number of steps. In addition, by processing the optical thin-film layer to a color filter, the manufacturing steps are greatly simplified, leading to reduced manufacturing costs.

According to the manufacturing method of the present invention, after the surface of a transparent substrate is oriented, the polymer liquid-crystal material is deposited to a predetermined film thickness on the substrate. By heating or slowly cooling this substrate, the polymer liquid crystal is oriented in the orientation direction, and thus a uniaxial optical thin film is formed. By controlling the film thickness of this uniaxial optical thin film, the function of a $\lambda/4$ phase shifter can be provided. As a result, since the $\lambda/4$ phase shifter of a large area can be manufactured integrally with the substrate, this can be suitably applied to a large-sized flat panel display or the like. Further, it becomes possible for the $\lambda/4$ phase shifter to be incorporated integrally into the inside of the liquid-crystal cell which forms the flat panel display, and a wide range of applications can be expected.

Many different embodiments of the present invention may be constructed without departing from the spirit and scope of the present invention. It should be understood that the present invention is not limited to the specific embodiments described in this specification. To the contrary, the present invention is intended to cover various modifications and equivalent arrangements included within the spirit and scope of the invention as hereafter claimed. The scope of the following claims is to be accorded the broadest interpretation so as to encompass all such modifications, equivalent structures and functions.

What is claimed is:

1. A liquid-crystal display device, comprising:
   a first substrate for receiving incident light, said first substrate having an inner surface on which a transparent electrode is formed;
   a guest-host liquid-crystal layer beneath the transparent electrode which contains a dichroic dye and which is uniformly oriented with respect to said transparent electrode;
   a plurality of reflective pixel electrodes beneath the liquid-crystal layer, each pixel electrode having formed thereabove in sequence a portion of an optical thin film layer followed by a portion of a passivation layer adjacent and beneath the liquid crystal layer;

the optical thin film layer having a predetermined optical anisotropic axis formed from a liquid-crystal polymer having liquid crystal molecules uniaxially oriented along the optical anisotropic path such that the optical thin film layer functions as a $\lambda/4$ phase shifter;

a switching element associated with each of the pixel electrodes, said switching elements being formed beneath the respective pixel electrode;

a lower substrate following beneath the switching element; and said optical thin-film layer including a plurality of coloring areas, and a pattern is formed for each coloring area, so as to form color filters.

2. The liquid-crystal display device according to claim 1, wherein an alignment film is provided on and beneath the transparent electrode.

3. The liquid-crystal display device according to claim 1, wherein said passivation layer is an alignment film which causes said liquid-crystal layer to be homeotropically oriented.

4. The liquid-crystal display device according to claim 1, wherein said passivation layer is an alignment film which causes said liquid-crystal layer to be homogeneously oriented.

5. The liquid-crystal display device according to claim 1 wherein said passivation layer comprises a photosensitive material.

* * * * *